Patented May 7, 1935

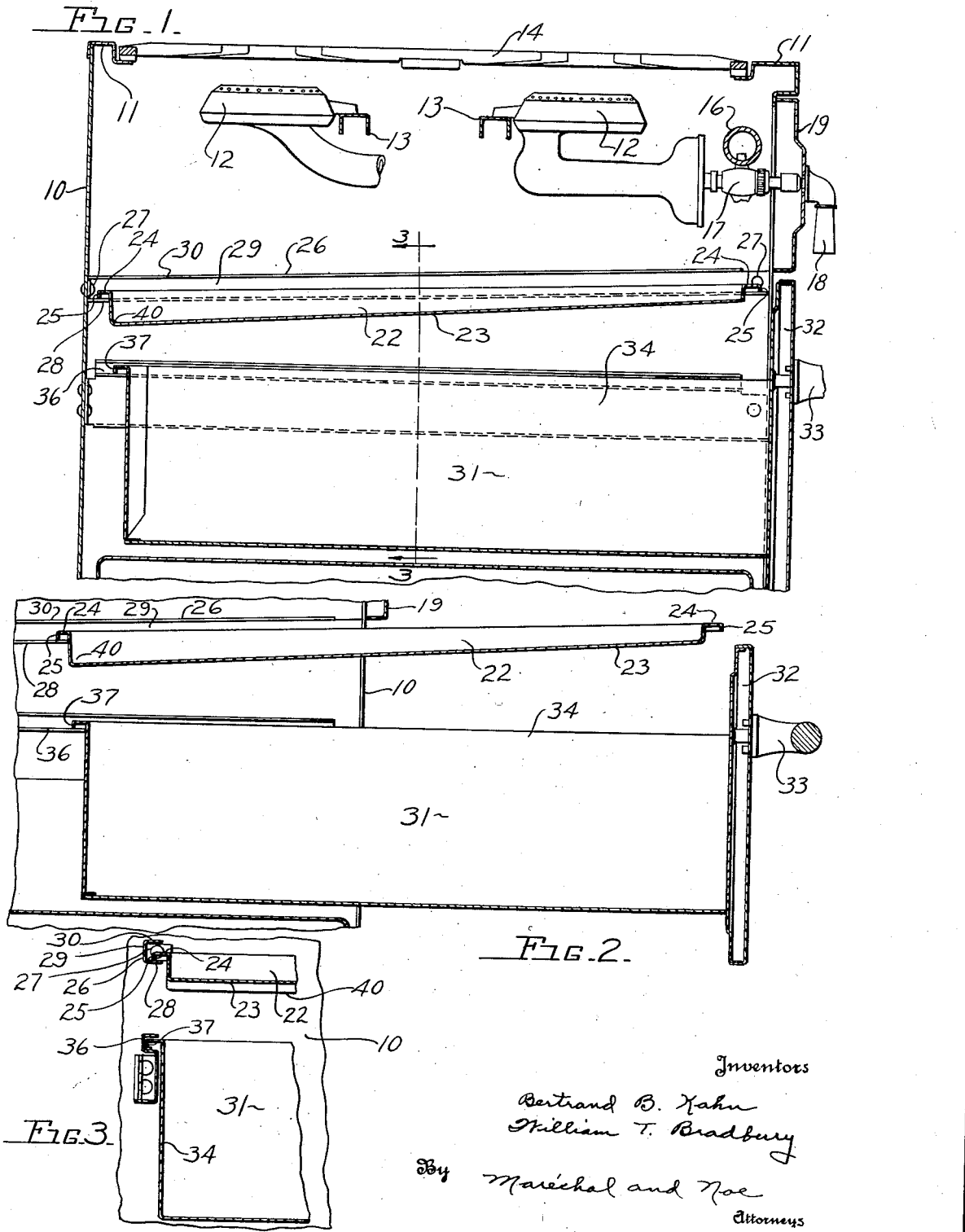

2,000,333

UNITED STATES PATENT OFFICE 2,000,333

STOVE

Bertrand B. Kahn, Cincinnati, and William T. Bradbury, Hamilton, Ohio, assignors to The Estate Stove Company, Hamilton, Ohio, a corporation of Ohio Application August 17, 1931, Serial No. 557,500

5 Claims. (Cl. 126—39)

This invention relates to stoves and more particularly to drip pans for use therein.

One of the principal objects of the invention is the provision of a stove drip pan of simple construction and of large carrying capacity and which is so arranged that upon withdrawal from the stove the contents of the pan are retained to avoid spilling.

Another object of the invention is the provision of a stove drip pan which when in use is contained within a drawer compartment of the stove and is readily accessible for removal from the stove upon opening the drawer; the withdrawal being accomplished while the pan is supported by the stove and without interference from the drawer.

Other objects and advantages of the invention will be apparent from the following description, the accompanying drawing and the appended claims.

In the drawing which illustrates a preferred embodiment of the invention—

Fig. 1 is a vertical sectional view through a stove having a drip pan constructed in accordance with the present invention;

Fig. 2 is a sectional view taken similarly to Fig. 1 showing the drip pan partly withdrawn; and Fig. 3 is a fragmentary sectional view taken on the line 3—3 of Fig. 1.

The drawing, in which like characters of reference designate like parts throughout the several views thereof, illustrates a stove of the kitchen range type which comprises generally a frame structure 10 upon which is mounted a cooking top 11. Cooking top burners 12, which are shown supported from members 13, stand within the opening of the cooking top and beneath a vessel supporting grill 14. A suitable fuel manifold 16 is provided to which valves 17 are connected for the control of fuel to the several burners 12. The burner valves 17 are actuated by operating handles 18 positioned within convenient reach of the stove operator and shown on the exterior of a closure member 19 which serves to conceal the burner valves and associated parts.

The burner grill 14 as shown is constructed of spaced bars to provide for efficient heat transfer from the burners to cooking vessels which are supported by the grill. The open grill permits drippings from the cooking vessels and other substances which may be spilled to pass through the grill and down into the stove body. In order to maintain the stove in a neat and attractive condition, and to provide for collection of such spilled substances, a drip pan 22 is positioned beneath the burners. The pan is preferably of such size as to underlie the entire cooking top opening and thus serves to catch and normally retain any substances which may pass through the grill 14. As shown, the drip pan comprises an integrally formed sheet metal member having a depressed or pit portion 23 which is enclosed by a flat bounding rim 24 that terminates in a downturned flange 25.

The drip pan 22 slides within the stove structure upon supporting members 26 shown in the form of sheet metal members of channel shaped cross section extending from front to rear of the stove and attached thereto by stove bolts 27. The channel shape of the supports 26 provides for accurate positioning of the drip pan which is adapted to slide on the lower flanges 28 of the channel while guided by the webs 29 and the overlying top flanges 30.

A drawer 31 is positioned in the stove structure beneath the drip pan 22. This drawer may, for example, be a service drawer where utensils and other articles for stove use are stored. As shown, the drawer 31 comprises a drawer front 32 having a handle 33, and an attached sheet metal portion 34 forming the bottom, rear and side walls of the drawer. The drawer is supported within the stove upon guides 36 which extend from the front to the rear thereof, and upon which the flanges 37, formed from the drawer portion 34, slide.

The top of the drawer portion 34, as defined by the flanges 37, is lower than the top of drawer front 32 which terminates closely adjacent the bottom of the closure member 19. The drawer opening is of such size that the drawer front 32 overlies this opening and provides a closure therefor. The space between the top of the drawer portion 34 and the top of the drawer opening is utilized for the location of the drip pan 22. As shown, the drip pan supports are inclined so that the rear ends of these supports stand lower than the front ends. By so positioning the supports, the drip pan is made readily accessible, as to withdraw the pan from the stove it is only necessary to open the drawer 31. As the door front moves horizontally when opened, and the pan moves outwardly in a path which extends upwardly from the horizontal, the operator is enabled to remove the pan 22 by merely opening the drawer and then reaching within the drawer opening to grasp the pan flange 25 (whereupon the pan may be slid outwardly without interference from the drawer front 32).

As the path of withdrawal of the pan is out of the way of the open drawer front no interference is encountered from the drawer and consequently the pan may be slid outwardly while retained on its supports 25. The supports thus serve during withdrawal of the pan as a means of holding the pan against unintentional tipping.

As a further aid to the retention of the pan contents during withdrawal, the pan is constructed of varying pit depth; the deepest portion, indicated at 40, being positioned at the rear of the stove. The inclined pit bottom wall and the inclined pan supports cooperate to direct toward this deepest part the material collecting in the pan pit. By providing such a reservoir the material falling into the pan will collect at that portion of the pan which is the last to be removed from the pan guides during withdrawal of the pan from the stove. The stove user is thus not only aided in withdrawing the drip pan by being enabled to allow it to slide out on its supports without being required to lift it until completely withdrawn, but is helped further by having the collected material within the pan retained in a deeper reservoir which is so positioned that it is the last part of the pan to be removed from the pan supports.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a stove, a drawer compartment, a drawer within said compartment, said drawer having a vertically extending front portion providing a closure for said compartment, drip pan supports in said compartment, a drip pan slidably mounted on said supports, said pan supports being inclined upwardly toward the front of the compartment for withdrawal of the pan thereon upon opening the drawer to a clearance position with respect to the plane of movement of the pan on the supports, in which position the drawer is partially withdrawn from said compartment.

2. In a stove, a drawer compartment, a drawer within said compartment, said drawer having a vertically extending front portion providing a closure for said compartment, drip pan supporting means in said compartment for sliding movement of a pan thereon, said supporting means being inclined upwardly toward the front of the compartment and affording a plane of movement for a pan that intercepts the drawer front when closed and that passes over the top of the drawer front when the drawer is partially withdrawn, and a pan slidable on said supporting means.

3. In a stove, a drawer compartment, a drawer within said compartment, said drawer having a vertically extending front portion providing a closure for said compartment, drip pan supporting means in said compartment for sliding movement of a pan thereon, said supporting means being inclined upwardly toward the front of the compartment and extending to closely adjacent the top of the drawer compartment and the top of the drawer front, said supporting means affording a plane of movement for a pan that intercepts the drawer front when closed and that passes over the top of the drawer front when the drawer is partially withdrawn, a pan slidable on said supporting means, said pan having a shallow front end affording access to the drawer interior and a deepened rear end providing a reservoir for the collection of drippings.

4. In a stove, a drawer compartment, a drawer within said compartment, said drawer having a vertically extending front portion providing a closure for said compartment, drip pan supports in said compartment extending adjacent the sides thereof for sliding movement of a drawer thereon, said supports being inclined upwardly toward the front of the compartment and extending to closely adjacent the top of the drawer compartment and the top of the drawer front, said supports affording a plane of movement for a pan that intercepts the drawer front when closed and that passes over the top of the drawer front when the drawer is partially withdrawn, a pan, said pan comprising a rim portion engageable with said supports and a pit portion inclined with respect to the rim portion, said pit portion being of shallow depth at the front end affording access to the drawer interior and deepened at the rear end affording a reservoir for the collection of drippings.

5. In a stove, a drawer compartment, a drawer within said compartment, said drawer having a vertically extending front portion providing a closure for said compartment, drip pan supporting means positioned in said compartment for sliding movement of a pan thereon, a pan carried by said supporting means and positioned immediately adjacent the top of the drawer compartment and extending to the drawer front, said pan having a shallow front end affording access to the drawer interior and a deepened rear end providing a reservoir for the collection of drippings.

BERTRAND B. KAHN.
WILLIAM T. BRADBURY.